United States Patent [19]

Edwards et al.

[11] 3,813,566

[45] May 28, 1974

[54] ELECTROMAGNETIC MOTIVE DEVICE

[75] Inventors: Harrison F. Edwards, Norwich, N.Y.; Louis A. Pannullo, Waterbury, Conn.

[73] Assignee: The Lewis Engineering Company, Naugatuck, Conn.

[22] Filed: Dec. 26, 1972

[21] Appl. No.: 318,577

[52] U.S. Cl. .................................. 310/36, 310/27
[51] Int. Cl. ........................................ H02k 33/18
[58] Field of Search ...................... 310/27, 36–39, 310/15 A, 268

[56] References Cited
UNITED STATES PATENTS
3,293,466 12/1966 Henry-Baudot ................. 310/268 X
3,310,695 3/1967 Kober ............................ 310/268 X
3,459,976 8/1969 Nyman ............................... 310/36

Primary Examiner—D. F. Duggan
Attorney, Agent, or Firm—H. Gibner Lehmann; K. Gibner Lehmann

[57] ABSTRACT

A high torque electromagnetic motive device comprising a permanent magnet slab having north and south poles respectively at its opposite sides, and comprising two essentially flat pole pieces each of annular configuration and each having a pair of corresponding portions engaged broadside with the opposite sides of the permanent magnet. Other portions of the pole pieces are disposed in spaced relation to one another so as to define an air gap. The device includes a coil in the form of a loop, which links one of the pole pieces, and means for movably mounting the coil to enable it to travel in an arcuate path in said air gap and along an annular portion of the pole piece that it links. The arrangement is such that an especially large angular displacement of the coil in excess of 200° is made possible, combined with high torque and low power consumption.

14 Claims, 8 Drawing Figures

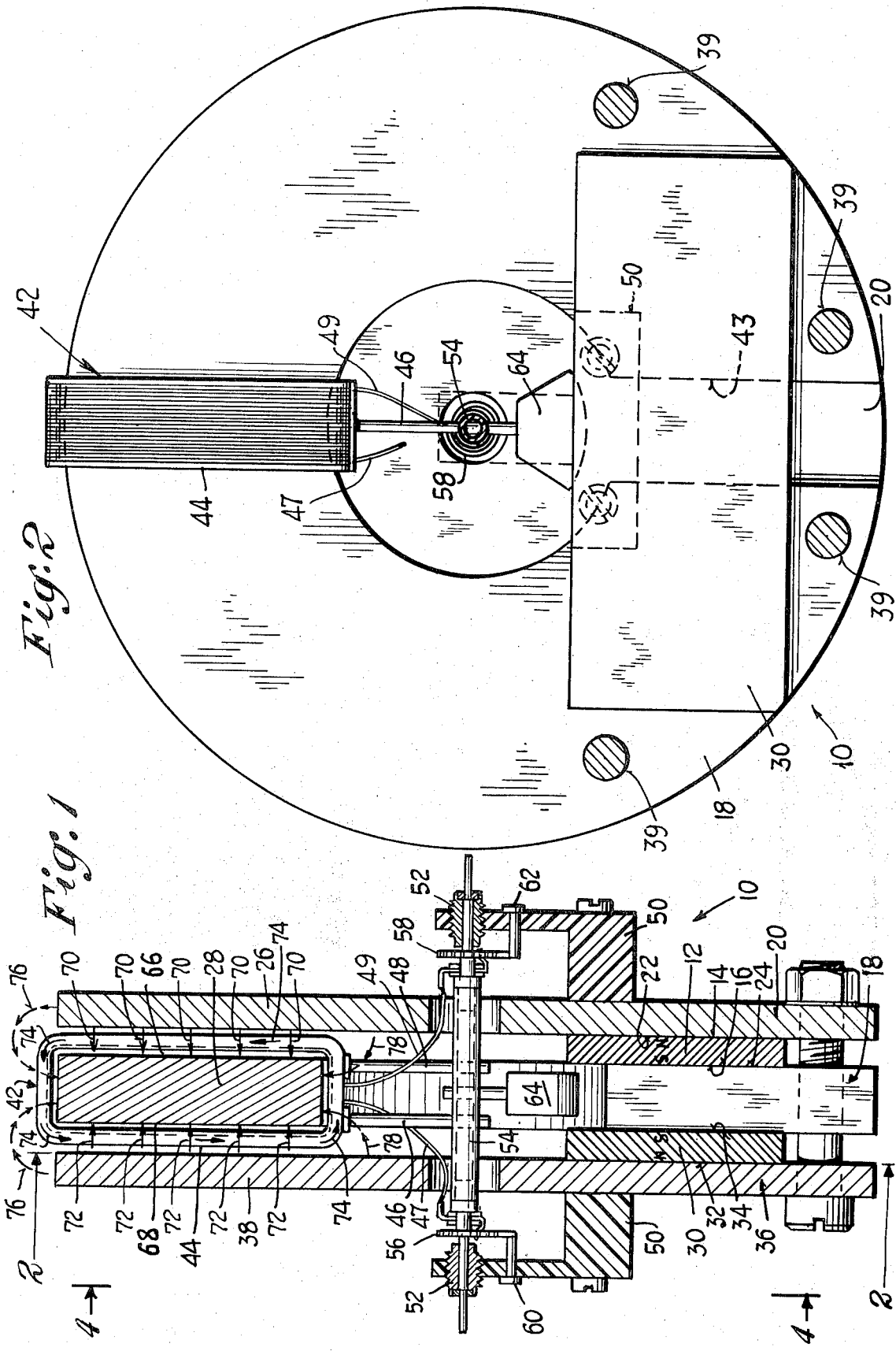

3,813,566

ELECTROMAGNETIC MOTIVE DEVICE

BACKGROUND

This invention relates generally to electromagnetic motive devices, and more particularly to meter and small devices such as instrument movements of the type employing stationary permanent magnet fields and current carrying coils movable in said fields. In the past, a number of different types of small motive devices, as in meter movements, have been proposed and constructed, the most common instrument movement being the d'Arsonval galvanometer. This movement employs at least one permanent magnet having opposite poles facing one another and disposed in spaced apart relation, and employs a fixed iron core between the poles, and a movable coil having portions respectively occupying the air gaps between the core and each of the two magnet poles. The coil is rotatable about an axis of symmetry parallel to the plane defined generally by a single coil loop. While the d'Arsonval movement has been satisfactory for a large number of applications, there are several disadvantages to its usual arrangement First, the torque available from such a movement, although more than adequate for driving a mirror reflector or pointer, is too small to drive the shaft of a potentiometer, for example, where the required torque is in the neighborhood of 0.4 ounce-inches (considering a typical 2 watt pot). Another disadvantage is that the useful angular displacement of most d.c. torque motors is usually less than 120°. While such a range is suitable for driving a pointer across a calibrated scale, it is not adequate for applications requiring large angular (or linear) displacements, such as driving the wiper or arm of a potentiometer over a substantial portion of its useful range.

SUMMARY

The above disadvantages and drawbacks of prior small electromotive devices, such as d'Arsonval movements, are obviated by the present invention which as for an object the provision of a novel and improved notably high-torque electromagnetic motive device which is especially simple in its construction while at the same time having wide-range angular displacements of 200° or more, all with low power consumption. A related object is the provision of a device or instrument movement as above characterized, which employs a movable coil having different portions which are under the influence of separate permanent magnet fields, and wherein the individual air gaps in which the coil is movably disposed are made as short as possible so as to maintain high magnetic flux therein and to enable the movement to develop a high torque.

The above objects are accomplished by the provision of an electromagnetic device or movement comprising a pair of slab-like permanent magnets disposed broadside to each other with one pair of like poles facing and juxtaposed in spaced relation, a thin, flat center pole piece of generally annular configuration disposed between said like poles, and two additional thin, flat annular pole pieces respectively engaged with the two remaining (remote) like poles of the magnets and having portions in spaced relation with respect to a corresponding portion of the center pole. A movable coil of loop-like configuration links the center pole piece and has mounting means adapted to enable its movement in an arcuate path along the annular portion of the pole piece that it links, traversing a path defined by the spaces between the poles. The arrangement is such that different portions of the coil are influenced respectively by the two separate permanent magnet fields, whereby excitation of the coil produces additive torques which are in the same direction, thus providing a drive torque of roughly twice the magnitude of that which would be produced by the same coil disposed in but a single magnetic field.

Other features and advantages will hereinafter appear.

In the drawings, illustrating several embodiments of the invention:

FIG. 1 is a vertical sectional view of the high torque motive device or movement of the present invention, showing two permanent magnets, three pole pieces and a movable coil linking the center pole piece.

FIG. 2 is a section taken on line 2—2 of FIG. 1.

Figure 3:
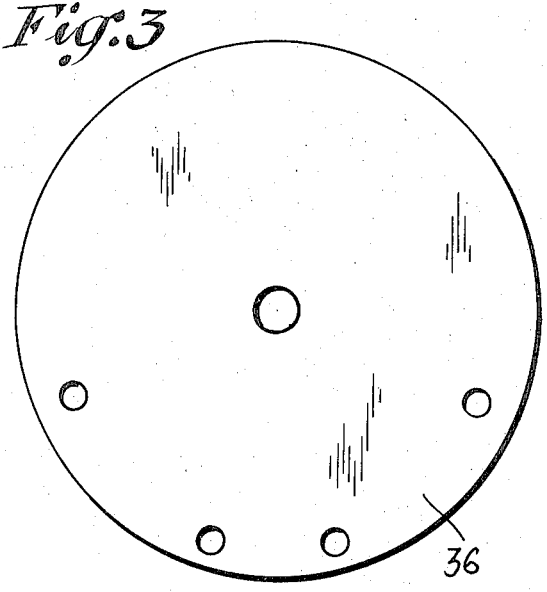
FIG. 3 is a front elevational view of one of the outer pole pieces of FIG. 1.
Figure 4:
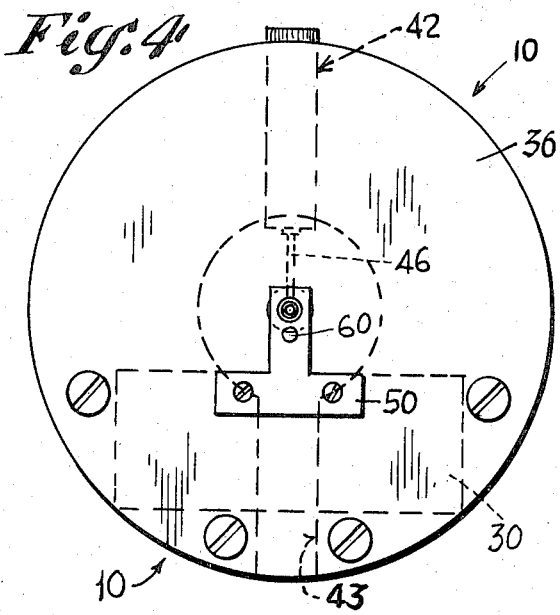
FIG. 4 is a view taken on line 4—4 of FIG. 1.

In accordance with the present invention and referring to FIGS. 1–4 there is illustrated a high torque instrument or meter movement 10 comprising a slab-like permanent magnet 12 having north and south poles respectively at its opposite sides 14, 16 and comprising annular pole pieces 18 and 20 in the form of flat rings with substantially circular outlines. The pole pieces 18, 20 have corresponding face portions 22, 24 engaged with the opposite sides 14 and 16 of the magnet, and further include other portions 26, 28 disposed in spaced-apart relation with respect to one another. An additional slab-like permanent magnet 30 is disposed on the other side of the center pole piece 18, and has north and south poles respectively at its opposite sides 32, 34; an additional pole piece 36 has a face portion which engages the side 32 of magnet 30. As illustrated, the magnets 12 and 30 are oriented with like poles (south) facing one another. One portion 38 of the pole piece 36 is disposed in spaced relation to the portion 28 of the pole piece 18, hereinafter referred to as the center pole piece. The pole pieces have aligned sets of holes 39 as shown in FIG. 2 by which the three pieces can be clamped to secure the two magnets therebetween in the manner illustrated in FIG. 1.

There is further provided a multi-turn coil 42 having a loop-like or annular configuration, and means for mounting the coil for movement in an arcuate path along the portion 28 of the center pole piece 18, which it physically links. During assembly of the movement, part of the coil can be passed through a radially extending slot 43 in the center pole piece 18, as best illustrated in FIG. 2. The coil 42 is preferably wound upon a form 44 and has stiff mounting supports 46, 48. The coil mounting means comprises a two-part bridge 50 of insulation fastened to opposite sides of the outer pole pieces 20 and 36 by means of screws (FIG. 2), jewel bearings 52 and an insulated shaft 54 rotatable therein. The leads 47, 49 coming from the coil 42 are connected respectively to inner ends of spiral biasing springs 56, 58. The other ends of the springs are connected to terminals 60, 62 through which the coil can be energized. A weight 64 carried on the insulated shaft 54 counterbalances the coil assembly.

Referring again to FIG. 1 it will be readily understood that the above arrangement two oppositely-directed magnetic fields will be established in the air gaps 66 and 68 respectively, between the pole pieces 20, 18 and 18, 36. The magnetic lines in each air gap 66, 68 will have the directions respectively indicated by arrows 70, 72. Assuming that a d.c. voltage is applied to the coil 42 through the terminals 60 and 62, resulting in current having the direction indicated by the arrow 74, portions of the coil 42 will experience a force (torque). The direction of the force on a linear portion of the coil is perpendicular to the magnetic field lines and also perpendicular to the direction of current flow and the sense is given by the familiar left hand rule. The magnitude of the force is proportional to the intensity of the magnetic field, the number of turns on the coil and to the current flowing through the coil, as well as the length of the coil disposed at right angles to the magnetic field. Thus, in FIG. 1, the wires of the coil lying in the air gap 66 experience a force in an upward direction, that is, out of the paper. This tends to drive the movable assemblage counterclockwise when viewed from the right. Similarly, those wires of the coil which lie in the air gap 68 experience a force in the same direction, since the directions of both the magnetic field (arrows 72) and the current (arrow 74) are opposite to that of the coil portion which is in the air gap 66. Consequently, for a given direction of d.c. current flow in the coil, both of the magnetic fields in the air gaps 66 and 68 contribute to the net force on the coil whereby for a given coil size and current, the force developed is twice that which would be realized if only a single permanent magnet and two pole pieces were employed. Also, a small force on the wires of the transverse end portions of the coil is developed. This is due to a fringing effect of the field at these ends, since the magnetic field is not precisely parallel to the current carrying wires. Two field lines 76 at the ends of the poles are illustrated in FIG. 1. Here it can be seen that where the magnetic field is not parallel to the direction of current flow a (somewhat weaker) force will be developed on the end coil portion, in a direction facing out of the paper. Similarly, a weak force in the same direction (out of the paper) will be developed on the inner transverse end portion of the coil, due to the magnetic field lines indicated by the numeral 78.

There are distinct important advantages to the above arrangement as provided by the invention. First, the force experienced by the coil is quite far from the axes of rotation of the coil assembly. This results in substantially greater torque being applied to the support rod or shaft 54 than would be the case if the coil were pivoted about an axis of symmetry while being disposed in a magnetic field of comparable intensity. Such an increased or greater torque in the neighborhood of 0.7 ounce-inches has been found to be ample for driving a potentiometer, when a magnetic field flux of 1,000–1,300 gauss is employed in the air gaps with a coil of 1,000 turns and current of not over 40 ma, as produced by an applied voltage of 13–14 volts. Suitable material for the permanent magnets has been found to be samarium cobalt alloy, or alternatively a marketed material known as Indox (a registeared trade mark).

Second, by virtue of the two elongate legs of the coil being disposed in the air gaps 66, 68, maximum utilization of the conductor length is made to thereby realize highest possible torque. Third, the construction is rugged and compact, such that the coil assembly is completely enclosed and protected by the pole pieces. In addition, there is no sacrifice of wide angular displacement, the present movement being capable of movement through angles in excess of 200°.

In the embodiment illustrated in FIGS. 1–4 the pole pieces are all of uniform thickness and of planar configuration. The center pole piece 18 has a thickness roughly twice that of the two outer pole pieces 20 and 36, since the center pole piece carries the combined flux of the outer two at the same level of excitation.

Figure 5:
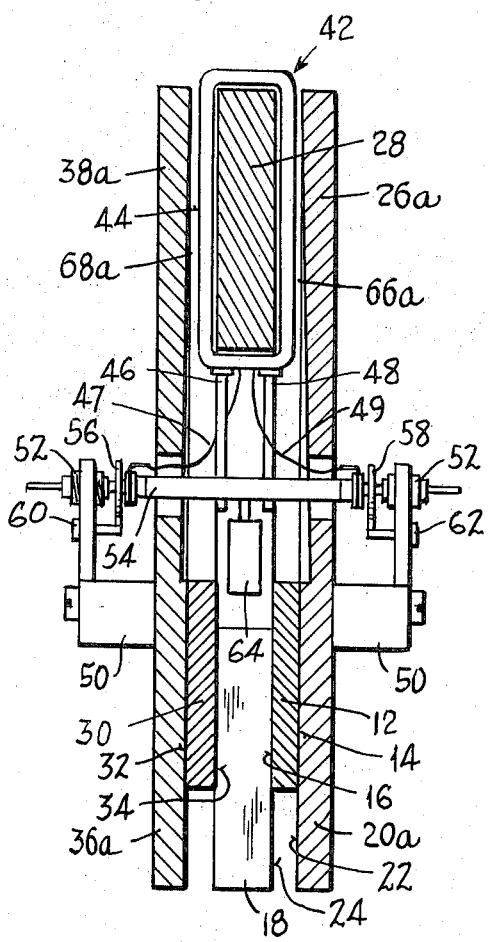
FIG. 5 is a vertical sectional view of a somewhat modified instrument movement or device, wherein the outer or end pole pieces have a tapered thickness.

Another embodiment of the invention is illustrated in FIG. 5, showing a modified movement comprising magnets 12 and 30, a center pole piece 18 of uniform thickness, outer pole pieces 20a and 36a, and a coil 42. The pole pieces 20a and 36a have portions 26a and 38a disposed in spaced relation to the portion 28 of the center pole piece 18, these pieces defining air gaps 66a and 68a respectively. In accordance with the present invention the pole portions 26a and 38a are of tapered and non-uniform cross section, such that the widths of the air gaps 66a and 68a decrease with increasing distance from the location of the magnets 12 and 30. This arrangement maintains as constant as possible the flux density in all portions of the air gaps. Due to the small but significant reluctance drop in the pole pieces 18, 20 and 36 of the embodiment of FIGS. 1–4, the flux in the air gaps is greatest at locations adjacent the magnets. By narrowing the gaps at locations removed from the magnets, a smaller reluctance drop occurs across the gap and the flux density therein is thus increased to compensate for the increased reluctance drop in the pole pieces. In FIG. 5, portions of the inner surfaces of the pole pieces 26a and 38a are thus given a hollow or dished configuration to achieve uniform air gap flux density. This has the desirable effect of providing a constant torque (for constant current excitation) independent of the radial position of the coil 42.

Figure 6:
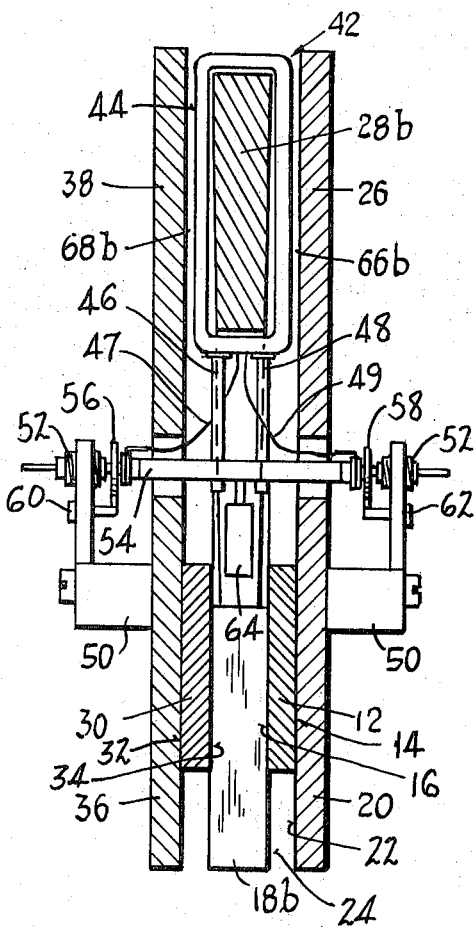
FIG. 6 is a vertical sectional view of still another embodiment of the invention, illustrating three pole pieces for use in an instrument movement or motive device wherein the center pole piece is of tapered thickness.

FIG. 6 illustrates yet another embodiment of the invention, showing an alternate arrangement for the three pole pieces to achieve uniform air gap flux density. The two outer pole pieces 20 and 36 have uniform thickness and are of planar configuration. The center pole piece has a portion 28b disposed in spaced relation with respect to the portions 26 and 38 respectively of the pole pieces 20 and 36. The portion 28b is tapered in thickness, such that the air gaps 66b and 68b decrease in size with increasing distance from the permanent magnets 12 and 30. Each of the broad opposite surfaces of the portion 28b are thus seen to have a somewhat hollow or dish-shaped configuration. Again, it is to be understood that by such an arrangement the reduction in air gap flux density at locations distant from the permanent magnets is compensated for by a smaller air gap at such locations. The pole pieces 20 and 36 are made sufficiently large in diameter so as to provide a protective shield for the coil 42 throughout its path of travel, as shown in the figures. This same arrangement could be used in connection with the other embodiments of the invention as well.

Figure 7:
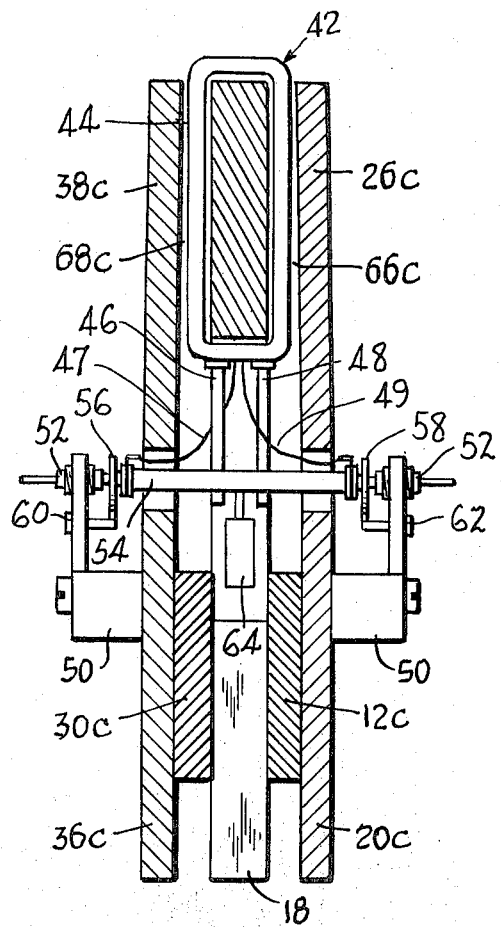
FIG. 7 is a vertical sectional view of yet another embodiment of the invention, illustrating three pole pieces wherein portions of the two outer pole pieces lie in convergent planes.

Still another embodiment of the invention is illustrated in FIG. 7, showing a modified pole arrangement. The center pole piece 18 has uniform thickness. The outer pole pieces 20c and 36c have portions 26c and 38c which lie in planes that are convergent. As a result, the sizes of the air gaps 66c and 68c decrease with increasing distance from the magnets 12c and 30c. Such an arrangement partially compensates for decreased flux density in the air gaps at locations spaced a distance from the permanent magnets. In FIG. 7, the magnets 12c and 30c are slightly thicker than those of FIGS. 1, 5, and 6 in order to provide sufficient clearance for the coil as required by the inwardly bent outer pole pieces. It will be readily understood that the pole arrangement of FIGS. 6 and 7 could be employed in place of the particular arrangement depicted in FIG. 1.

Figure 8:
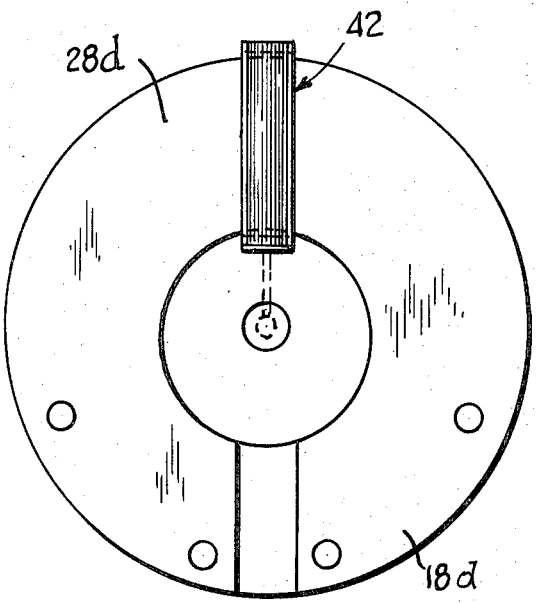
FIG. 8 is a front elevational view of yet another embodiment of the invention, showing a pole piece having an annular portion of tapered width which varies circumferentially.

Yet another embodiment of the invention is shown in FIG. 8, wherein the annular portion of the center pole piece 18d has a tapered width, the maximum width being at the part diametrically opposite the location of the magnets (not shown in this Figure). It can be seen that as the coil 42 moves in an arcuate path along the annular portion 28d of the pole piece from the position shown, the elongate legs of the coil will encounter a reduction in flux due to the decreased width of the annular portion 28d of the pole piece. The amount of taper given to the width can be contoured to closely compensate for the decrease in flux density in the air gap at locations spaced a distance from the magnets, thus providing a nearly constant torque independent of the rotary position of the coil for a given current exitation. While FIG. 8 illustrates only the center pole piece having a tapered width, it will be understood that instead, each of the outer pole pieces could be made to have tapered widths and employed with a center pole piece of uniform width, with similar results.

From the above it can be seen that we have provided a novel and improved electromotive device adaptable as an instrument movement, which provides a unique combination of high torque, large angular displacement in excess of 200°, and low power consumption, the present device being capable of a 0.7 ounce-inch torque at a ½-watt power level. In addition, the device is rugged and compact, representing a distinct advance and improvement in meter movement technology.

Variations and modifications are possible without departing from the spirit of the invention.

We claim:

1. A high torque electromagnetic motive device comprising, in combination:
   a. a permanent magnet having north and south poles respectively at its opposite sides,
   b. a pair of pole pieces of annular configuration having corresponding face portions disposed respectively against the opposite sides of said magnet,
   c. other portions of said pole pieces being disposed in spaced apart relation with respect to each other and forming an air gap,
   d. a loop-shaped coil physically linking one of said pole pieces, and
   e. means mounting the coil for arcuate movement along an annular portion of said one pole piece and in a path containing said air gap.

2. The invention as defined in claim 1, and further including:
   a. an additional permanent magnet having north and south poles respectively at its opposite sides,
   b. said magnet having one of its sides disposed against a face portion of one of said pole pieces opposite the face portion thereof engaged by said first magnet, like poles of the magnets engaging said one pole piece, and
   c. an additional pole piece of annular configuration having a face portion disposed against the other side of said additional magnet,
   d. other portions of said additional pole piece being disposed in spaced relation with respect to said one pole piece, whereby the latter constitutes the center one of the pole pieces,
   e. a portion of said coil travelling in a path defined by the space between said other portion of the additional pole piece and said one pole piece.

3. The invention as set forth in claim 2, wherein:
   a. said center pole piece has a thickness greater than that of the other two pole pieces, to enable it to carry the combined magnetic flux of the other two substantially without increased saturation.

4. The invention as set forth in claim 1, wherein:
   a. said pole pieces comprise flat rings respectively, having substantially circular outlines.

5. The invention as set forth in claim 1, wherein:
   a. one of said pole pieces has a radially extending slot to enable portions of it to be inserted in the coil for linkage therewith.

6. The invention as set forth in claim 2, wherein:
   a. said center pole piece has a radially extending slot to enable portions of it to be inserted in the coil for linkage therewith.

7. The invention as set forth in claim 1, wherein:
   a. said permanent magnet comprises a flat slab having opposite sides of relatively large expanse as compared with the thickness thereof.

8. The invention as set forth in claim 2, wherein:
   a. said permanent magnets comprise flat slabs, respectively, having opposite sides of relatively large expanse as compared with the thicknesses thereof.

9. The invention as set forth in claim 2, wherein:
   a. at least one of said pole pieces has a tapered thickness to render more uniform the magnetic flux density in the air gaps between said center pole piece and the other pole pieces.

10. The invention as set forth in claim 2, wherein:
    a. the two outer pole pieces each have tapered thicknesses to render more uniform the magnetic flux density in the air gaps.

11. The invention as set forth in claim 2, wherein:
    a. at least two said pole pieces are disposed in convergent planes to render more uniform the magnetic flux density in the air gap,
    b. said magnets being disposed between the most widely spaced portions of the pole pieces.

12. The invention as set forth in claim 1, wherein:
    a. at least one of said pole pieces has a tapered width to render more uniform the magnetic flux density in the air gap between the pole pieces.

13. The invention as set forth in claim 2, wherein:

a. at least one of said pole pieces has a tapered width to render more uniform the magnetic flux density in at least one of the air gaps between the pole pieces.

14. The invention as set forth in claim 13, wherein:
a. the center one of the pole pieces has the tapered width.

* * * * *

Disclaimer 3,813,566.—*Harrison F. Edwards*, Norwich, N.Y. and *Louis A. Pannullo*, Waterbury, Conn. ELECTROMAGNETIC MOTIVE DEVICE. Patent dated May 28, 1974. Disclaimer filed Feb. 14, 1975, by the assignee, *The Lewis Engineering Company*.

Hereby enters this disclaimer to claims 1, 4, 5 and 7 of said patent.

[*Official Gazette July 15, 1975.*]